(12) United States Patent
Rutz et al.

(10) Patent No.: US 11,209,386 B2
(45) Date of Patent: Dec. 28, 2021

(54) ELECTROCHEMICAL SENSOR

(71) Applicant: Mettler-Toledo GmbH, Greifensee (CH)

(72) Inventors: Andreas Rutz, Zürich (CH); Daniel Zwahlen, Klingnau (CH)

(73) Assignee: Mettler-Toledo GmbH, Greifensee (CH)

( * ) Notice: Subject to any disclaimer, the term of this patent is extended or adjusted under 35 U.S.C. 154(b) by 733 days.

(21) Appl. No.: 15/479,574

(22) Filed: Apr. 5, 2017

(65) Prior Publication Data
US 2017/0299546 A1  Oct. 19, 2017

(30) Foreign Application Priority Data
Apr. 15, 2016  (EP) .................................. 16165559

(51) Int. Cl.
| | |
|---|---|
| *G01N 27/416* | (2006.01) |
| *G01N 27/36* | (2006.01) |
| *G01N 27/333* | (2006.01) |
| *G01N 27/403* | (2006.01) |

(52) U.S. Cl.
CPC ....... *G01N 27/4167* (2013.01); *G01N 27/333* (2013.01); *G01N 27/36* (2013.01); *G01N 27/4161* (2013.01); *G01N 27/4035* (2013.01)

(58) Field of Classification Search
CPC .. G01N 27/4167; G01N 27/36; G01N 27/333; G01N 27/4161; G01N 27/4035; G01N 27/26
See application file for complete search history.

(56) References Cited

U.S. PATENT DOCUMENTS

| | | | |
|---|---|---|---|
| 3,145,157 A | 8/1964 | Arthur et al. | |
| 3,671,414 A * | 6/1972 | Grubb .................. | G01N 27/333 204/414 |
| 4,166,020 A | 8/1979 | Trampert | |
| 5,571,394 A * | 11/1996 | Hettiarachchi .... | G01N 27/4035 204/400 |
| 7,176,692 B2 | 2/2007 | Adami et al. | |
| 7,182,847 B1 | 2/2007 | Millar et al. | |
| 7,972,495 B1 | 7/2011 | Millar et al. | |
| 8,128,989 B1 | 3/2012 | Millar et al. | |
| 9,128,043 B2 | 9/2015 | Russell | |
| 2002/0180609 A1* | 12/2002 | Ding .................... | G01N 27/333 340/633 |
| 2003/0178305 A1* | 9/2003 | Catalano .............. | G01N 27/401 204/433 |
| 2006/0001431 A1* | 1/2006 | Adami ............... | G01N 27/4035 324/446 |
| 2008/0083620 A1* | 4/2008 | Hirshberg .......... | G01N 27/4035 204/416 |

(Continued)

*Primary Examiner* — Joshua L Allen
(74) *Attorney, Agent, or Firm* — Standley Law Group LLP; Jeffrey S. Standley; Stephen L. Grant

(57) ABSTRACT

An electrochemical sensor for potentiometric measurements in a measurement medium has a sensor head (201) at an end of a longitudinal sensor body (203). A sensing electrode (210) and a reference electrode (220) are disposed within the longitudinal sensor body. A liquid junction (223) is established between the reference electrode and the sensing electrode. The sensor is characterized by a protective outer shaft (250) with a polymeric sensor sleeve (230), which is electrically isolating, disposed within the protective outer shaft.

9 Claims, 4 Drawing Sheets

(56) References Cited

U.S. PATENT DOCUMENTS

| | | | |
|---|---|---|---|
| 2011/0048971 A1* | 3/2011 | Bower | G01N 27/4035 205/787.5 |
| 2014/0090978 A1* | 4/2014 | Tower, III | G01N 27/4035 204/433 |
| 2014/0144776 A1* | 5/2014 | Wilhelm | G01N 27/4035 204/403.06 |
| 2014/0158536 A1* | 6/2014 | Thompson | G01N 27/333 204/406 |

* cited by examiner

ELECTROCHEMICAL SENSOR

CROSS-REFERENCE TO RELATED APPLICATIONS

This application claims a benefit of priority to European application EP 16165559.2, filed on 15 Apr. 2016, which is incorporated by reference as if fully recited herein.

TECHNICAL FIELD

The disclosed embodiments relate to an electrochemical sensor and more, specifically, to an improved electrochemical sensor for potentiometric measurements in a measurement medium.

BACKGROUND

Over the years, a variety of electrochemical electrodes and sensors have been developed for potentiometric determinations. A typical example of such an electrochemical sensor is a combination electrode comprising a sensing electrode and reference electrode enclosed in a glass shaft system. The sensing electrode commonly comprises a sensing electrode shaft filled with an electrolyte and a sensitive membrane at the end of the sensing electrode shaft body that can be immersed in a measurement medium. The reference electrode commonly comprises a reference element, a reference electrolyte and a liquid junction. The liquid junction is known to establish an electrolytic connection between the reference electrode and the measurement medium. In a combination electrode the sensing electrode is surrounded by the reference electrode with the exception of the sensitive membrane. The shaft of the sensing electrode, the shaft of the reference electrode as well as the sensitive membrane are made of glass. A commonly known combination electrode is schematically shown in FIG. 1.

Electrochemical sensors are commonly used in various applications to determine a respective measurement value of the measurement solution or medium. Examples for such electrochemical sensors are e.g. ionsensitive sensors and in particular pH sensors. Application areas of such sensors include monitoring of the respective measurement value in environments such as industrial processes as well as laboratories. Industrial process environments can comprise very sensitive environments, such as biological, biochemical or pharmaceutical environments, or also very tough process conditions involving e.g. high pressures, high temperatures and/or harsh chemical environments.

In a process environment, involving either a harsh environment or a very sensitive environment, an electrochemical sensor can be inserted into a housing or an interchangeable housing for introduction into the process plant or a reaction vessel comprising the measurement medium. Such a housing protects the glass sensor shaft against accidental breakage and also allows e.g. the introduction of the electrochemical sensor at different levels or insertion depths within the reaction vessel.

In particular during maintenance or installation of these sensor systems, breakage of the glass sensing electrode of these electrochemical sensors can occur due to poor or negligent handling by non-lab personnel. This could further lead to not only a destruction of the electrochemical sensor but could also lead to contamination of the measurement medium through outflowing electrolyte or glass shards. Moreover, exposed destructed or leftover glass pieces of the electrochemical sensor can be particularly harmful to personnel in the event of maintenance or handling wherein personnel are exposed to the threat of injuring themselves because of exposed broken glass pieces. Such events may also result in processes involving replacements as well as costly interruptions in process operations.

However, the use of electrodes or sensors in various process and laboratory analytical environments often necessitates standard mounting configurations in order to enable easy and hassle free installation in existing sensing housing configurations. One such example is the use of standard 12 mm diameter glass membrane sensors, which fit into most of the current sensor housings and interchangeable sensor housing.

US 2011 0048 971 A1 discloses an electrochemical sensor configured for compatibility with industry standard mounting and insertion hardware. Said sensor comprises an inner sensing shaft, which is fabricated from glass, in combination with a sturdy outer shaft fabricated from a polymeric material. The reference electrode is arranged in the space between the inner shaft and the outer shaft. In order to enhance the robustness of the sensor, the outer shaft is configured as a robust polymeric shaft.

A drawback of this setup is that the space for the reference electrode and therefore the space for the reference electrolyte is limited, as the polymeric shaft has to be thicker than the formerly used glass shaft in order to be as robust. Further, depending on the polymeric material used, the sensor is less versatile than a glass sensor, as polymeric materials are more prone to facilitate e.g. growth of biological residues and like residues.

Therefore, there exists a need for an improved electrochemical sensor that can be used in different environments and in particular in harsh chemical environments under high temperatures and high pressures, which would also conform to existing industry standard mounting in sensor housings.

SUMMARY

This need is met by an an electrochemical sensor for potentiometric measurements in a measurement medium comprising a sensor head; a longitudinal sensor body having a proximal end being attached to the sensor head; a sensing electrode and a reference electrode being disposed within the longitudinal sensor body; a liquid junction for establishing an electrolytic contact between the reference electrode and the measurement medium; and a sensor sleeve; and wherein the reference electrode is disposed between the sensing electrode and the sensor sleeve. The electrochemical sensor further comprises a protective outer shaft; and the sensor sleeve is a polymeric sleeve, which is electrically isolating and is disposed within the protective outer shaft.

The electrochemical sensor according to the invention is advantageous as it is very robust and can be used in a wide variety of environments due to the protective outer shaft, while the polymeric sleeve provides an electric insulation between the reference electrolyte and the protective outer shaft.

The polymeric sleeve is preferably only a thin sleeve or tubelike structure which is still flexible, respectively shows a residual elasticity, and facilitates easy insertion into the protective outer shaft, which provides increased sturdiness to the electrochemical sensor. Further due to the thinness of the sleeve wall the space between the sensing electrode shaft and the polymeric sleeve respectively the sensor sleeve is maximized. Therefore, the internal space for the reference electrolyte is increased, respectively maximized, thereby increasing the lifetime of the electrochemical sensor as well as lowering the duration between sensor exchanges and/or between refilling of the reference electrolyte.

The inner diameter of the protective outer shaft is preferably about equal to the outer diameter of the sensor sleeve and the longitudinal sensor body comprising the sensor sleeve can be easily press-fitted in to the outer protective shaft owing to the advantage of flexibility or residual elasticity of the polymeric sensor sleeve.

In a further embodiment the polymeric sleeve is disposed as coating on the inner surface of the protective outer shaft. The polymeric sleeve and the protective outer shaft can be disposed as a single workpiece.

The terms "distal" and "proximal" respectively "distal end" and "proximal end" are used here in relation to the orientation of the electrochemical sensor during operation. The proximal end of the electrochemical sensor is the end that is directed towards the sensor head while the distal end is defined as the end part of the electrochemical sensor that is immersible in the measurement medium. Furthermore, the definitions of the proximal end and distal end are extendable to various components that are present in the electrochemical sensor.

In a further embodiment the sensor sleeve comprises a fluoropolymer, in particular the sensor sleeve comprises at least of one of the following polymers: polyvinylidene fluoride (also known as polyvinylidene difluoride), perfluoroalkoxy alkane, polymeric perfluoroether, fluorinated ethylene propylene, ethylene-tetrafluoroethylene, perfluoralkoxy-polymers.

In a further embodiment the sensor sleeve comprises polyether ether ketone (PEEK). Apart from being electrically isolating, PEEK has very advantageous material properties, such as high thermal stability and high chemical resistance, for example against oxidizing agents, solvents, acids and alkalis substances. This is particular advantageous for using an electrochemical sensor according to the invention in harsh chemical environments that involve high temperature and pressure conditions.

The electrochemical sensor further comprises a support structure, which is configured to support the sensor sleeve. This support structure comprises a polymer preferably PEEK and is disposed around the sensing electrode shaft near its distal end. The support structure further comprises the reference junction, which for example is a porous ceramic element. Particulary advantageous is the use of a polymeric support structure which allows the polymeric sensor sleeve to be bonded to said support structure and/or the sensor head with a suitable adhesive.

In a further embodiment the protective outer shaft is a metallic shaft and comprises at least one of the following metals or metal alloys: titanium, nickel base alloy and stainless steel. In particular the use of titanium as material for the other protective shaft is advantageous as titanium provides a very good resistance against harsh chemical environments.

The protective outer shaft further comprises a protective cage at the distal end of the sensing electrode shaft for protecting the sensitive membrane. Said protective cage can be disposed as e.g. as protruding wall elements of the protective outer shaft or as an element containing openings, which can be attached to the protective outer shaft.

In another embodiment the electrochemical sensor further comprises a temperature sensor for measuring the temperature of the measurement medium. An electrochemical sensor with a temperature sensor enables accounting for temperature changes within the measurement medium during a measurement.

The sensing electrode preferably comprises a sensing electrode shaft, a sensitive membrane disposed at a distal end of the sensing electrode shaft and disposed to be immersible in the measurement medium, an inner electrolyte, and a lead-off element disposed within the inner electrolyte.

The reference electrode comprises a reference element disposed within a reference electrolyte and the liquid junction for establishing an electrolytic contact between the reference electrode and the measurement medium.

BRIEF DESCRIPTION OF THE DRAWINGS

Other features and advantages disclosed herein will become more apparent from the following detailed description of exemplary embodiments when read in conjunction with the following figures, wherein similar features have similar reference numerals. The figures show:

FIG. 2b is a cross section along section XX' of the electrochemical sensor of FIG. 2a;

FIG. 2c is an enlarged view of a portion of the electrochemical sensor of in FIG. 2a.

DETAILED DESCRIPTION

Figure 1:
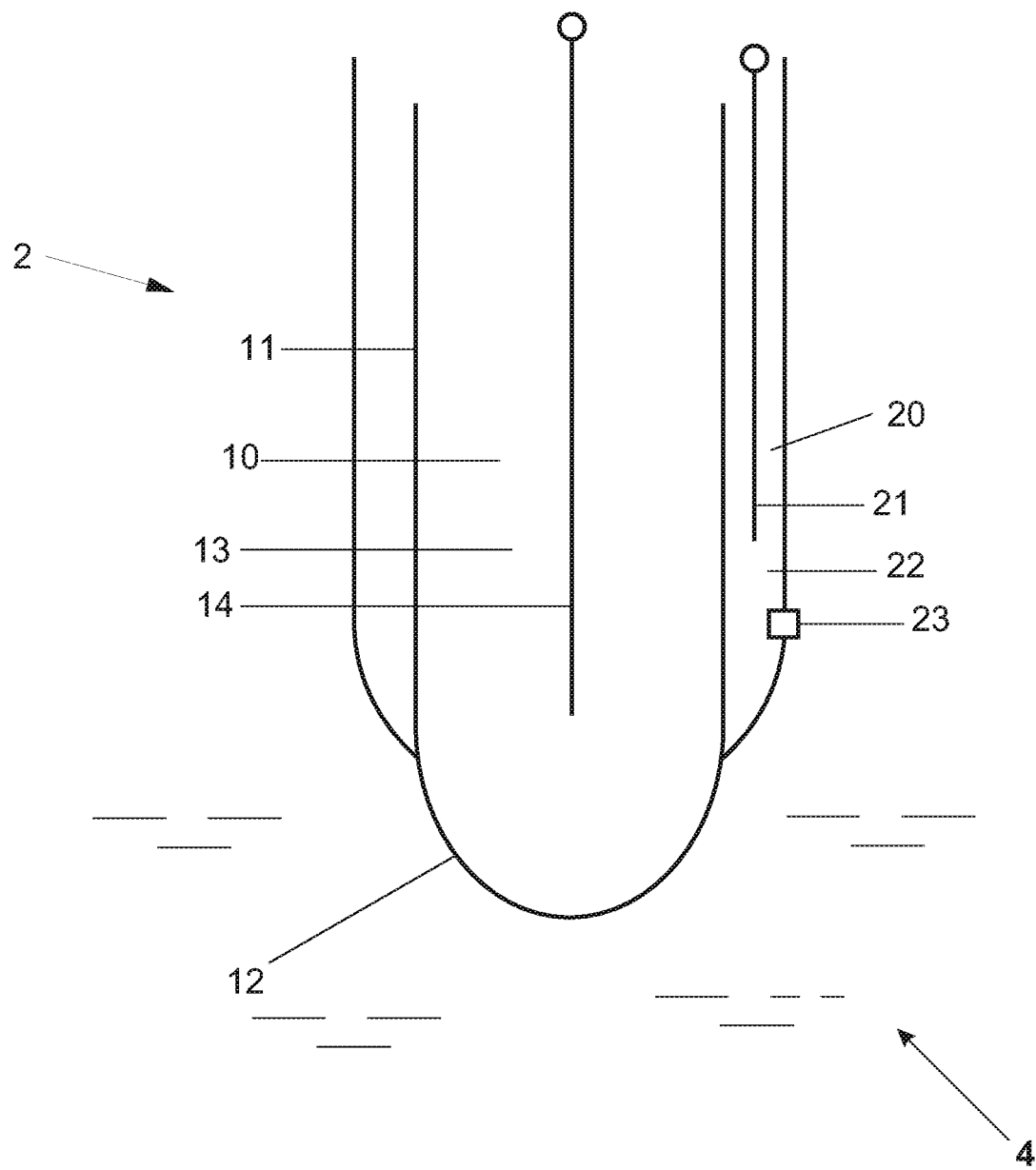
FIG. 1 is a schematic cross section through an electrochemical sensor as known in the prior art.

FIG. 1 schematically shows an electrochemical sensor as known in the prior art. The electrochemical sensor comprises a longitudinal sensor body 2, a sensing electrode 10 and a reference electrode 20.

The sensing electrode 10 comprises a sensor electrode shaft 11 and a sensitive membrane 12, which is attached to a distal end of the sensor electrode shaft 11 and is disposed in a measurement medium 4 during a measurement. Within the sensor electrode shaft 11 an inner electrolyte 13 and a lead-off element 14 are disposed.

Typically, the sensing electrode shaft 11 is made of glass and the sensitive membrane 12 may be a glass hemisphere or a glass membrane. The sensitive membrane 12 senses changes in ionic species of the ion to be measured in the measurement medium 4. For applications involving pH measurements, the sensitive membrane 12 is a pH sensitive glass membrane whereas for selective ions, the sensitive membrane is an ion selective membrane.

One end of the lead-off 14 element, which often comprises silver/silver chloride, is immersed in the inner electrolyte 13 having a defined pH value, which acts as electrically conductive connection between the inside surface of the sensitive membrane 12 and the lead-off element 14. The other end of the lead-off element 14 is connected to a sensor head (not shown here) via an insulated conductor such as e.g. a platinum wire or a silver wire.

The reference electrode 20 comprises a reference element 21, reference electrolyte 22 and a liquid junction 23 and provides a stable potential against the potential of the sensing electrode 10.

A free end of the reference element 21, often comprising silver/silver chloride, is immersed in the reference electrolyte 22, such as a potassium chloride (KCl) solution. On its other end, the reference element 21 is connected to the sensor head by means of an insulated conductor, such as a platinum wire or a silver wire. An electrolytic contact between the reference electrolyte 22 and the measurement medium 4 is established by means of the liquid junction 23, for example a porous ceramic plug or any other type of liquid junction.

FIGS. 2a, 2b, 2c and FIG. 3 show embodiments of an electrochemical sensor according to the present invention. The figures are representative schematics of the electrochemical sensor and are not drawn to scale.

Figure 2A:
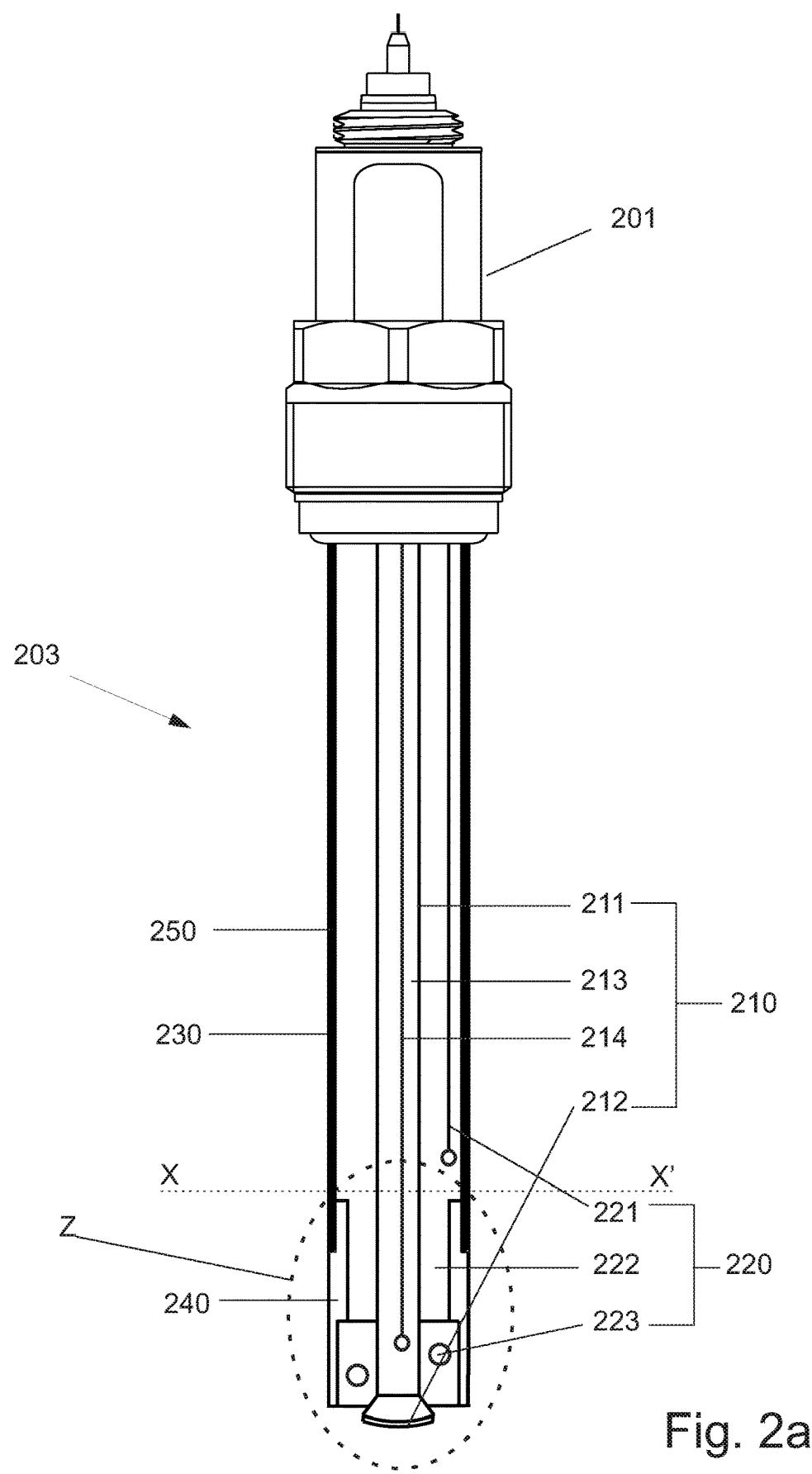
FIG. 2a is a longitudinal cross section through an electrochemical sensor according to the invention.

As shown in FIG. 2a, the electrochemical sensor comprises a sensing electrode 210 that is housed within a longitudinal sensor body 203. A sensor head 201 is attached to a proximal end of the longitudinal sensor body 203.

The terms "distal" and "proximal" respectively "distal end" and "proximal end" are used here in relation to the orientation of the electrochemical sensor during operation. The proximal end of the electrochemical sensor is the end that is directed towards the sensor head while the distal end is defined as the end part of the electrochemical sensor that is immersible in the measurement medium. Furthermore, the definitions of the proximal end and distal end are extendable to various components that are present in the electrochemical sensor.

The sensing electrode 210 is disposed concentrically within the longitudinal sensor body 203 and comprises a sensing electrode shaft 211 that encloses a lead-off element 214 and an inner electrolyte 213. At its distal end, the sensing electrode shaft 211 comprises the sensitive membrane 212 that is immersible in the measurement medium (see FIG. 1) for measuring an ionic species of interest.

The electrochemical sensor can for example be a potentiometric pH sensor with a pH sensitive glass membrane 212 having a defined shape, for example spherical. The sensitive membrane 212 can also be shaped hemispherical, cylindrical, spear, flat or as a very narrow ending shaft disposed with a micro tip or and/or another suitable membrane shape known in the prior art. In alternative embodiments, the sensitive membrane 212 is disposed as selective ion sensitive membrane.

The lead-off element 214, such as a silver/silver chloride wire or filament is immersed in the inner electrolyte 213. The lead-off element 214 is connected to the sensor head 201 via an insulated conductor.

Around the sensing electrode shaft 211 a sensor sleeve 230 is disposed-, thereby providing an annular space 225 (shown in FIG. 2b) between itself and the sensing electrode shaft 211. Preferably the sensor sleeve 230 is disposed along the entire length of the sensing electrode shaft 211. The sensor sleeve 230 comprises a polymeric composition, such as a fluoropolymer and in particular at least of one of the following polymers: polyvinylidene fluoride (also known as polyvinylidene difluoride), perfluoroalkoxy alkane, polymeric perfluoroether, fluorinated ethylene propylene, ethylene-tetrafluoroethylene, perfluoralkoxy-polymers. In a further embodiment the polymeric composition comprises PEEK.

Further a protective outer shaft 250 is disposed over the sensor sleeve 230 for protecting the polymeric sensor sleeve 230 and making the electrochemical sensor more robust. The protective outer shaft 250 and the sensor sleeve 230 can be designed as single workpiece, wherein the sensor sleeve 230 is disposed as coating on the inner surface of the protective outer shaft 250.

The protective outer shaft 250 comprises a metal or metal alloy, which is preferably chosen from a material that is resistant to harsh chemical environments, corrosion and is sturdy in physical configuration. Preferably, the protective outer shaft 250 comprises at least one of the following metals or metal alloys: titanium, nickel base alloy or stainless steel. The disposition of the protective outer shaft 250 provides a robust electrochemical sensor that is able to withstand harsh chemical environments.

A reference electrode 220 is disposed in the annular space 225, which comprises a reference element 221, a reference electrolyte 222 and a liquid junction or reference junction 223. The reference electrolyte 222 is disposed in the annular space 225 (Shown in FIG. 2b). The reference electrode 220 can for example be a silver/silverchloride electrode. The reference electrolyte 222 comprises a gelled composition, preferably an ion-permeable microporous polymer gel. In another embodiment, the reference electrolyte is a liquid composition, preferably a 3 mol/L KCl saturated with AgCl.

A distal end of the reference element 221 is immersed in the reference electrolyte 222 and its proximal end is connected to the sensor head 201 via an insulated conductor. The liquid junction or reference junction 223 is disposed at the distal end 205 of the electrochemical sensor. As shown here the liquid junction 223 is disposed as an annular diaphragm that is press-fitted within a support structure 240 and preferably comprises polytetrafluoroethylene (PTFE). Such liquid junctions are known for their robust nature and are particularly used in highly contaminated applications and tough environments. The liquid junction 223 that is arranged within the support structure 240 can also be a porous ceramic plug or an open junction allowing full contact between the reference electrolyte 222 and the measurement medium 203. Preferably, such an open junction is provided at the distal end of the electrochemical sensor and on its side in the support of structure. Open junctions are typically used in combination with gelled electrolytes.

Figure 2B:
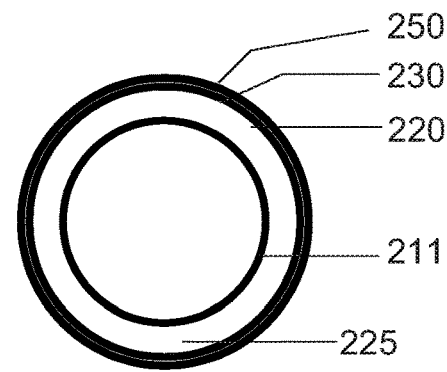

FIG. 2b shows a cross section along section XX' of the electrochemical sensor of FIG. 2a. The cross section provides a top view of the electrochemical sensor which shows annular placements of the sensing electrode shaft 211, sensor sleeve 230 disposed as coating on the inner surface of the protective outer shaft 250 as well as the space between the sensor sleeve 230 and the sensing electrode shaft 211 which is filled with the reference electrolyte 222 (see FIG. 2a). As seen in FIG. 2b and explained above, the sensing electrode shaft 211 is disposed as the innermost part of the electrochemical sensor while the protective outer shaft 250 with the sensor sleeve 230 is present as the outermost part of the electrochemical sensor.

Further, the protective outer shaft 250 with the sensor sleeve 230 is disposed over the sensing electrode shaft 211 such that the inner diameter of the sensor sleeve 230 is greater than the outer diameter of the sensing electrode shaft 211. Therefore, the protective outer shaft 250 with the sensor sleeve 230 is disposed to provide an annular space 225 between itself and the sensing electrode shaft 211. The reference electrode 220 is disposed in the annular space 225 such that the reference electrode 220 is concentrically spaced around the sensing electrode 210.

Figure 2C:
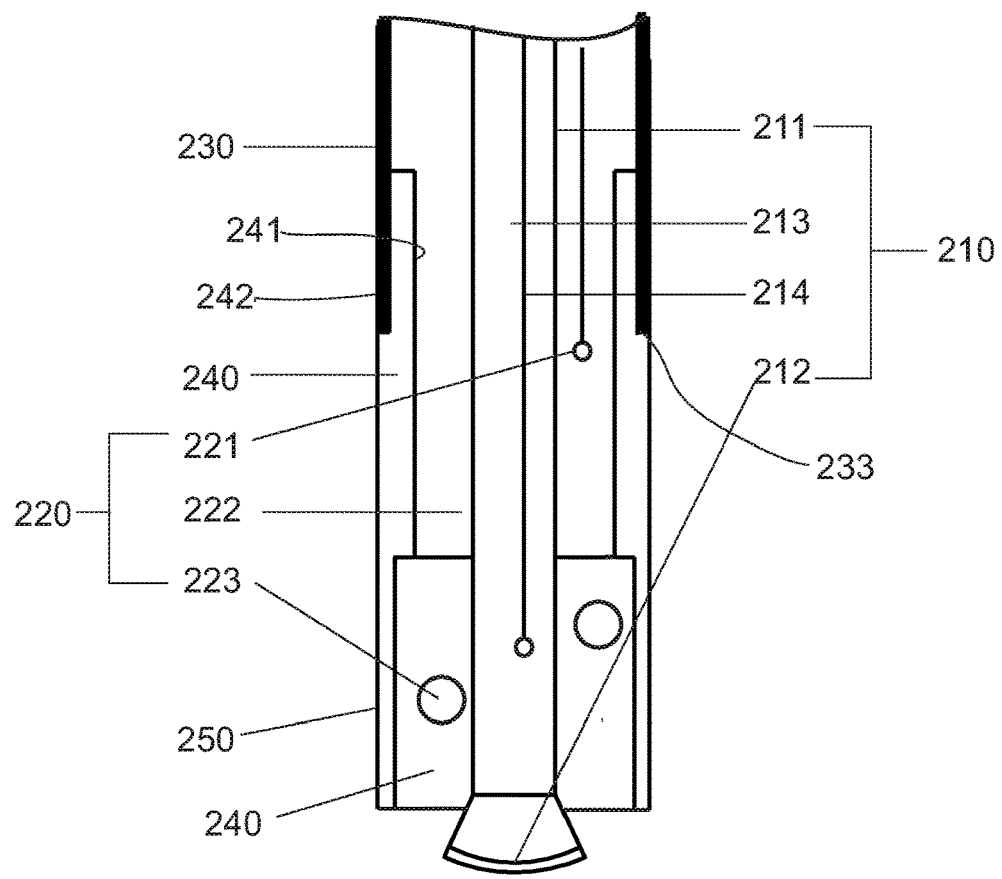

FIG. 2c shows a blown up view of the distal end of the electrochemical sensor that is represented by the dotted circle Z in FIG. 2a. As described above, the sensing electrode shaft 211 delimiting the sensor electrode 210 is disposed within the longitudinal sensor body 203 of the electrochemical sensor. The protective outer shaft 250 with the polymeric sensor sleeve 230 is then disposed over the sensing electrode 210 within which the reference electrode 220 is housed in the annular space 225 (see FIG. 2b).

The sensor sleeve 230 is supported on the sensing electrode shaft 211 by a support structure 240 that is arranged between the sensor sleeve 230 and the sensing electrode shaft 211. Said support structure 240 is in this embodiment arranged between the sensor sleeve 230 on its outer side 242 and the reference electrolyte 222 on its inner side 241. Preferably, the support structure 240 extends longitudinally approximately from near the distal end 233 of the sensor sleeve 230. Furthermore, the sensor sleeve 230 is configured to partially extend over the length of the sensing electrode 210 of the electrochemical sensor. In another embodiment, the sensor sleeve 230 extends longitudinally from the distal end of support structure 240 to the sensor head 201.

Furthermore, at the distal end of the support structure 240 corresponding to the distal end of the electrochemical sensor, the liquid junction 223 is present such that the liquid junction 223 is press-fitted into the support structure 240.

The liquid junction 223 can be disposed as a distinctive element within the support structure 240.

Figure 3:
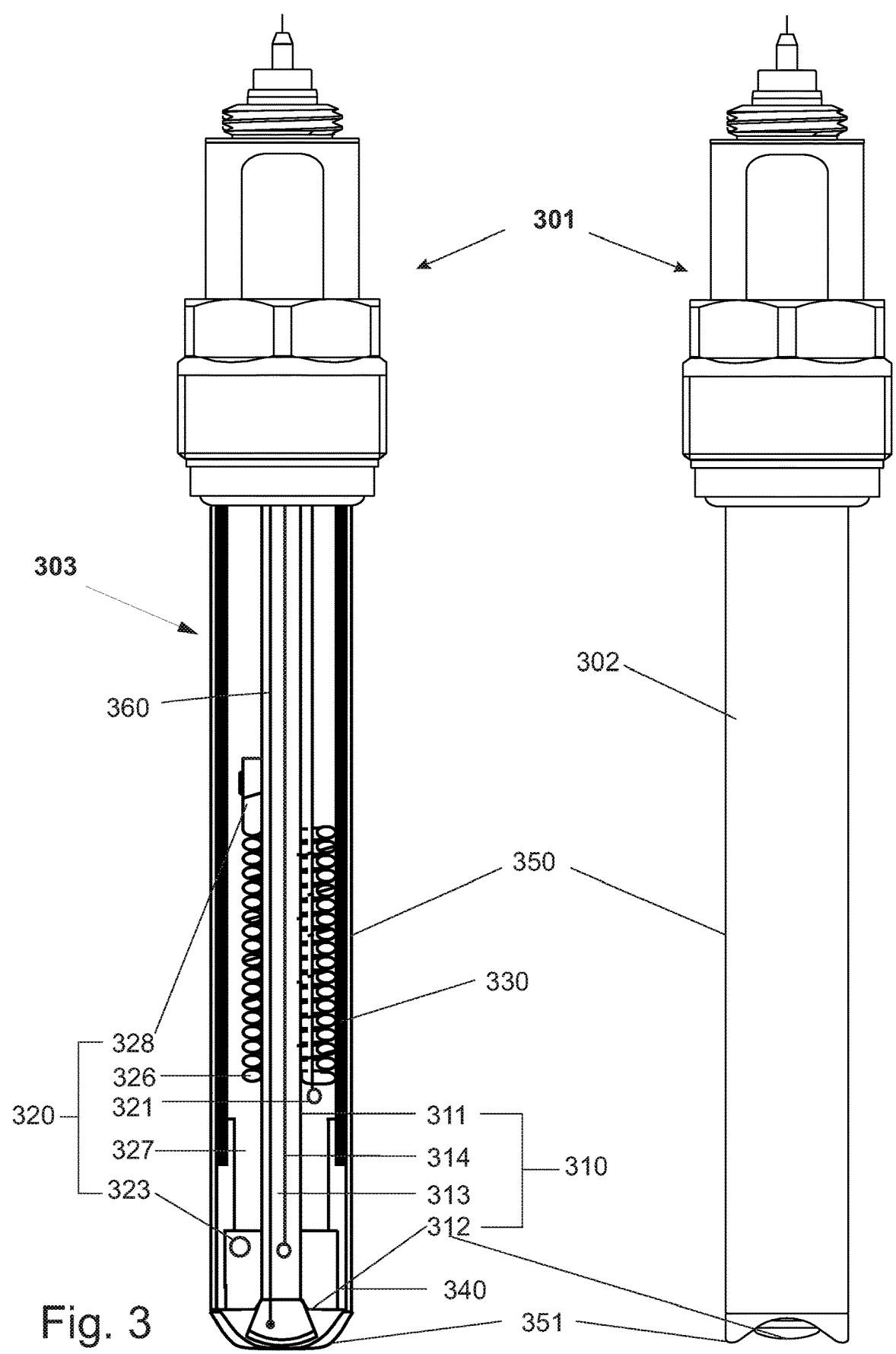
FIG. 3 is a schematic of another embodiment of an electrochemical sensor.

FIG. 3 shows a schematic cross section of another embodiment of an electrochemical sensor with an alternative reference electrode 320 and comprising a protective outer shaft 350 disposed over the sensor sleeve 330, wherein the inner diameter of the protective outer shaft 350 is approximately equal to the outer diameter of the sensor sleeve 330.

Preferably, the protective outer shaft 350 is completely disposed over the sensor sleeve 330 such that it extends longitudinally from the proximal end to the distal end of the longitudinal sensor body 303 and radially, it extends 360 degrees around the sensor sleeve 330. In a preferred embodiment, the inner diameter of the protective outer shaft 350 is approximately equal to the outer diameter of the sensor sleeve 330.

In a preferred embodiment, the protective outer shaft 350 comprises a metal or metal alloy, which is preferably chosen from a material that is resistant to harsh chemical environments, corrosion and is sturdy in physical configuration. Preferably, the protective outer shaft 350 comprises at least one of the following metals or metal alloys: titanium, nickel base alloy or stainless steel. The disposition of the protective outer shaft 350 provides a robust electrochemical sensor that is able to withstand harsh chemical environments.

Additionally, the polymeric sensor sleeve 330, in particular its residual flexibility, allows the sensor sleeve 330 to be disposed over the sensing electrode 310 and the reference electrode 320 further to be easily inserted into the protective outer shaft 350 and thereon into a housing such that the sensor sleeve 330 provides a degree of flexibility and prevents any damage to the components of the electrochemical sensor during the assembly of the electrochemical sensor. The residual flexibility exists as the sensor sleeve 330 is disposed as a tubelike structure composed of a thin polymeric film with a thickness in the range of about 0.1 mm to 0.3 mm, and preferably of approximately 0.2 mm.

Further, an adhesion enhancing layer (not shown) can be provided between the protective outer shaft 350 and the sensor sleeve 330 in order to arrange the protective outer shaft 350 over the sensor sleeve 330. Preferably, the adhesion enhancing layer comprises an epoxy resin.

The electrochemical sensor further comprises within the longitudinal sensor body 303 the sensing electrode 310 and reference electrode 320 along with the sensor sleeve 330 and protective outer shaft 350 as described above. The sensing electrode 310 comprises the sensing electrode shaft 311, sensitive membrane 312, inner electrolyte 313 and lead-off element 314 and these are disposed within the longitudinal sensor body 302 as explained above with reference to FIG. 2a. Further, the longitudinal sensor body 302 also comprises the reference electrode 320 that is disposed within the sensor sleeve 330 and the sensing electrode 310. The reference electrode 320 comprises the reference element 321, reference electrolyte 322 and liquid junction 323.

In the embodiment illustrated in FIG. 3, the reference electrolyte is disposed as gelled electrolyte in a double-gelled electrolyte chamber comprising a primary electrolyte chamber 326 and a secondary electrolyte chamber 327. The disposition of this double-gelled electrolyte chamber comprising the primary electrolyte chamber 326 and secondary electrolyte chamber 327 offers a very long diffusion path for the reference electrolyte. The primary electrolyte chamber 326 is wound concentrically around the sensing electrode 310 such that it spirally occupies a specific length-wise area around the sensing electrode shaft 311 whereas the secondary electrolyte chamber 327 is disposed around the primary electrolyte chamber 326 such that it is present in the annular space (see FIG. 2b). The primary electrolyte chamber 326 is provided with an interior diaphragm 328 that is disposed as a non-flow diffusion junction. Typically, the interior diaphragm 328 comprises a ceramic diaphragm.

The longitudinal sensor body 303 further comprises a protective cage 351 at its distal end, which provides additional protection to the sensitive membrane 312. The protective cage 351 can be disposed as part of the outer protective shaft 350 or of the support structure 340.

In a further embodiment according to the invention, the electrochemical sensor comprises a temperature sensor 360 for measuring the temperature of the measurement medium. The temperature sensor 360 is disposed within the sensing electrode shaft 311. The temperature sensor 360 enables accounting for temperature changes within the measurement medium during a measurement.

Although the invention has been described by illustrating specific embodiments, clearly, many further embodiments and variations can be derived from a knowledge of the present invention; as an example, where the features of the individual embodiments are combined together and/or individual functional units of the embodiments are exchanged. In particular, the sensor sleeve can be designed either as a coating on the inner surface of the protective outer shaft or a tubelike structure. Further the embodiment of FIG. 2 may comprise a temperature sensor described in relation to FIG. 3.

What is claimed is:

1. An electrochemical sensor for potentiometric measurements in a measurement medium, comprising:
    a sensor head;
    a sensing electrode comprising a sensing electrode shaft;
    a longitudinal sensor body, having a proximal end thereof attached to the sensor head, and having a protective metallic outer shaft that surrounds the sensing electrode shaft to define an annular space therebetween;
    a reference electrode comprising a reference element, a reference electrolyte, and a liquid junction that is positioned between the reference electrode and the measurement medium to establish electrolytic contact between the reference electrolyte and the measurement medium, the reference electrode contained in the annular space; and
    a sensor sleeve, configured as a polymeric coating on an inner surface of the protective metallic outer shaft, such that the sensor sleeve, the sensing electrode and the reference electrode are disposed in the longitudinal sensor body, and the reference electrode is disposed between the sensing electrode and the sensor sleeve, the sensor sleeve being electrically isolating to provide an electric insulation between the reference electrolyte and the metallic outer shaft.

2. The electrochemical sensor of claim 1, wherein the polymeric coating comprises a fluoropolymer.

3. The electrochemical sensor of claim 2, wherein the fluoropolymer is selected from the group consisting of: polyvinylidene fluoride, perfluoroalkoxy alkane, polymeric perfluoroether, fluorinated ethylene propylene, ethylene-tetrafluoroethylene, and perfluoralkoxy-polymers.

4. The electrochemical sensor of claim 1, wherein the polymeric coating comprises polyether ether ketone (PEEK).

5. The electrochemical sensor of claim 1, further comprising a support structure, positioned to support the sensor sleeve.

6. The electrochemical sensor of claim 1, wherein the protective metallic outer shaft comprises at least one of: titanium, nickel base alloy, and stainless steel.

7. The electrochemical sensor of claim 1, wherein:
the sensing electrode further comprises a sensitive membrane located at a distal end of the sensing electrode shaft; and
a protective cage, formed as a part of the protective metallic outer shaft at the distal end of the sensing electrode shaft to protect the sensitive membrane.

8. The electrochemical sensor of claim 1, further comprising a temperature sensor, arranged to measure a temperature of the measurement medium.

9. The electrochemical sensor of claim 1, wherein the sensing electrode further comprises:
a sensitive membrane disposed at a distal end of the sensing electrode shaft for immersion in the measurement medium;
an inner electrolyte disposed within the sensing electrode shaft; and
a lead-off element disposed within the inner electrolyte.

* * * * *